US012746555B2

(12) United States Patent
Van Ornum et al.

(10) Patent No.: US 12,746,555 B2
(45) Date of Patent: Sep. 29, 2026

(54) FOAM REMOVAL ATTACHMENT

(71) Applicant: Rock Road Company Sales, LLC, Weyauwega, WI (US)

(72) Inventors: Luykas Michael Van Ornum, Waupaca, WI (US); Ethan Mitchell Van Ornum, Waupaca, WI (US); Aidan Ford Van Ornum, Waupaca, WI (US)

(73) Assignee: Rock Road Company Sales, LLC, Weyauwega, WI (US)

( * ) Notice: Subject to any disclaimer, the term of this patent is extended or adjusted under 35 U.S.C. 154(b) by 420 days.

(21) Appl. No.: 18/233,170

(22) Filed: Aug. 11, 2023

(65) Prior Publication Data

US 2025/0050350 A1 Feb. 13, 2025

(51) Int. Cl.
*B02C 18/18* (2006.01)
*B24B 23/02* (2006.01)

(52) U.S. Cl.
CPC .............. *B02C 18/18* (2013.01); *B24B 23/02* (2013.01)

(58) Field of Classification Search
CPC ....... B02C 18/184; B02C 18/18; A01G 23/00; B23B 27/12; Y10T 29/50; Y10T 29/5182; Y10T 409/3042; Y10T 407/1952
See application file for complete search history.

(56) References Cited

U.S. PATENT DOCUMENTS

| | | | | |
|---|---|---|---|---|
| 2,449,605 | A | 9/1948 | Kelton | |
| 3,286,348 | A | 11/1966 | Kunst | |
| 4,948,307 | A | 8/1990 | Dodds | |
| 5,647,419 | A * | 7/1997 | Stewart | B27G 13/10 407/46 |
| 6,394,378 | B1 * | 5/2002 | Ragnarsson | B02C 18/18 241/294 |
| 6,422,495 | B1 * | 7/2002 | De Boef | B02C 18/067 241/294 |
| 6,464,157 | B1 * | 10/2002 | Balvanz | B02C 13/2804 241/300 |

(Continued)

FOREIGN PATENT DOCUMENTS

WO WO-2008049880 A1 * 5/2008 ........... B02C 18/146

OTHER PUBLICATIONS

Diamond Liners, Foam Planer, as viewed at https://www.diamondliners.com/Foam-Planer on Apr. 28, 2023 (3 pages).

(Continued)

*Primary Examiner* — Sara Addisu
(74) *Attorney, Agent, or Firm* — Brannen Law Office, LLC

(57) ABSTRACT

A foam removal attachment has an outer perimeter with projections, each of the projections having a passage passing between a leading face and a trailing face. The attachment is used with a core that is selectively removably secured to a surface conditioning tool or drum tool (such as a grinder) having a rotating shaft. The core rotates under the operation of the tool shaft. The core can have a polygonal outer profile and the attachment can slidingly mate with the core, whereby rotation of the attachment and core occur simultaneously. At least some foam debris can pass around and though the projection during use. The projections can be arranged in a spiral path around the outer wall of the attachment. The attachment can be easily replaced in an economical manner.

19 Claims, 15 Drawing Sheets

(56) References Cited

U.S. PATENT DOCUMENTS

| | | | | |
|---|---|---|---|---|
| 6,802,176 | B2 * | 10/2004 | Gaudreault | A01D 34/535 144/34.1 |
| 6,840,471 | B2 * | 1/2005 | Roozeboom | B02C 13/09 241/294 |
| 7,293,729 | B2 * | 11/2007 | Ragnarsson | B02C 18/18 241/300 |
| 7,454,821 | B2 | 11/2008 | Cooper et al. | |
| 7,703,713 | B2 * | 4/2010 | Smith | B27L 11/005 241/242 |
| 7,959,099 | B1 * | 6/2011 | Cox | B02C 18/18 241/294 |
| 8,707,542 | B2 | 4/2014 | Dirks et al. | |
| 9,248,453 | B2 * | 2/2016 | Pfoltner | B02C 18/18 |
| 9,623,420 | B2 * | 4/2017 | Dobrovosky | B02C 13/06 |
| 9,820,422 | B2 * | 11/2017 | Campey | A01D 34/53 |
| 11,338,298 | B2 * | 5/2022 | Verzilli | B02C 18/145 |
| 2001/0045478 | A1 * | 11/2001 | Recker | B02C 18/145 241/294 |
| 2005/0188484 | A1 | 9/2005 | Lytle | |
| 2009/0189004 | A1 * | 7/2009 | Pallmann | B05C 17/015 241/291 |
| 2009/0254181 | A1 * | 10/2009 | Boyd | A61F 2/4611 623/17.11 |
| 2010/0206973 | A1 * | 8/2010 | Cotter | B02C 13/2804 241/192 |
| 2011/0226880 | A1 * | 9/2011 | Marquardsen | B02C 18/18 241/195 |
| 2011/0266382 | A1 * | 11/2011 | Labbe | A01G 23/093 241/294 |
| 2012/0018560 | A1 * | 1/2012 | Denis | B02C 18/18 241/294 |
| 2012/0248231 | A1 * | 10/2012 | Fredsall | B02C 18/06 241/300 |
| 2012/0321397 | A1 * | 12/2012 | Sjoo | B23F 21/166 407/29 |
| 2013/0008991 | A1 * | 1/2013 | Morey | B02C 18/18 241/291 |
| 2014/0217220 | A1 * | 8/2014 | Weinberg | B02C 18/145 241/282.1 |
| 2014/0261889 | A1 * | 9/2014 | Labbe | B02C 18/184 144/231 |
| 2015/0251188 | A1 * | 9/2015 | Wada | B02C 18/145 241/291 |
| 2017/0079219 | A1 * | 3/2017 | Stanley | B02C 13/28 |
| 2019/0082589 | A1 * | 3/2019 | Litwiller | A01F 29/095 |
| 2021/0268512 | A1 * | 9/2021 | Denis | B02C 18/18 |
| 2022/0241910 | A1 * | 8/2022 | Rogers | B02C 18/182 |
| 2024/0198352 | A1 * | 6/2024 | Denis | B02C 18/18 |

OTHER PUBLICATIONS

Keystone Engineering, Pavement Marking Removal Drums, as viewed at https://www.keystonecutter.com/pave-mark-drums-surf-prep.aspx on Feb. 25, 2025, copyright notice on web page states year as 2020 (9 pages).

J&R Products Inc., Krendl 24" Stud Scrubber, as viewed at https://jrproductsinc.com/product/krendl-24-stud-scrubber/ on Apr. 26, 2023 (2 pages).

Pinnacle West Inc., Plane Easy Foam Planer, as viewed at https://pinnaclewestore.com/cartquickpro/catalog_product/view/id/2091 on Apr. 28, 2023 (1 page).

* cited by examiner

FOAM REMOVAL ATTACHMENT

BACKGROUND OF THE INVENTION

1. Field of the Invention

The present invention relates to a foam removal attachment and in particular to a foam removal attachment used with a handheld surface conditioning tool or drum tool (such as a grinder) to remove excess foam from foam installations, artistic application and other locations where foam removal is desired.

2. Description of the Related Art

It is very often desirable to use insulation with a structure such as a building. The insulation not only is useful for temperature control, but also for noise control and, depending upon the insulation, moisture control.

There are many types of insulation, including batt insulation, blown insulation and foam insulation. The use of foam insulation has many desirable attributes. Yet, sometimes, the use of foam can necessitate a bit of additional work before further construction can occur. For example, sometimes, due to overspray, expansion, or otherwise, some foam protrudes from a cavity or otherwise ends up being located in an undesired area. The excess foam needs to be removed before materials, such as drywall or paneling can be installed as to be installed items are generally installed flush with the studs.

It is often desirable to remove foam in other applications as well, such as in artistic applications where an object is created from a large volume of foam.

Excess foam can be removed by hand scraping, which is a time consuming and difficult task. Mechanical devices can also be used to remove the excess foam.

Some grinders or planers use high friction material to grind away the foam. This can cause excessive amounts of dust, and the high friction material can unintentionally damage items such as studs, wiring and plumbing.

Other devices use rotating blades to remove the excess foam. The blades can unintentionally damage items such as studs, wiring and plumbing if contacted by the blade.

Some grinders use solid protrusions to remove the excess foam. The protrusions contact the foam to knock it out of the way of the teeth that rotate on the drum.

Further, existing tools are heavy and cumbersome to operate, are expensive to purchase and have drums that are expensive to replace.

None of the known items have the unique advantages of the present invention.

Thus, there exists a need for a foam grinding attachment that solves these and other problems.

SUMMARY OF THE INVENTION

A foam removal attachment has an outer perimeter with projections, each of the projections having a passage passing between a leading face and a trailing face. The attachment is used with a core that is selectively removably secured to a surface conditioning tool or drum tool (such as a grinder) having a rotating shaft. The core rotates under the operation of the tool shaft. The core can have a polygonal outer profile and the attachment can slidingly mate with the core, whereby rotation of the attachment and core occur simultaneously. At least some foam debris can pass around and though the projection during use. The projections can be arranged in a spiral path around the outer wall of the attachment. The attachment can be easily replaced in an economical manner.

There are many aspects of the present invention, which each can have unique and independent advantages, as set out in particular in the appended claims.

According to one advantage of the present invention, the attachment can have a plurality of protrusions such as teeth. Each tooth can have a passage allowing air and some small pieces of removed debris to pass through the passage. This allows for fast evacuation of debris without overly processing of the debris. Further, this advantageously allows for air to pass thought the passage to aid in cooling of the projections. Reduction in projection temperature slows and, in some cases, can even prevent thermal damage and possible premature failure.

According to another advantage of the present invention, the projections can be arranged in a spiral design around the outer wall of the attachment. In a preferred embodiment, there is an overlap between passages of successive protrusions along the path of the spiral.

According to a further advantage of the present invention, the leading face of the protrusion can have a top with a sharp edge. This advantageously allows the top of the leading face to shave or carve excess foam instead of removal via blunt contact.

According to a still further advantage yet of the present invention, several spirals of projections can be provided. This ensures continuous projection engagement during each attachment revolution.

According to a further advantage of the present invention, a core can be provided to selectively receive the attachment. The core and attachment can have mating profiles, such as polygons, which allow them to rotate together. The attachment can be easily replaced if worn or if a different projection profile is desired for a given project.

According to a still further advantage of the present invention, the attachment can be used with a tool with a rotating shaft, such as a hand-held surface conditioning tool or drum tool (for example, a grinder) and accordingly is easy to use, is portable, is efficient and practical.

According to a still further advantage yet of the present invention, a slot or other opening can be provided for aiding in a preferred three-dimensional manufacturing process. The inclusion of the slot prevents a vacuum from forming in the interior of the shell as the printer plate rises during the sequence of printing the shell.

According to a still further advantage of the present invention, the foam removal attachment can be used in artistic applications of creating objects, from removing foam from boats, movie sets, around the house etc.

Other advantages, benefits, and features of the present invention will become apparent to those skilled in the art upon reading the detailed description of the invention and studying the drawings.

DETAILED DESCRIPTION OF PREFERRED EMBODIMENTS

While the invention will be described in connection with one or more preferred embodiments, it will be understood that it is not intended to limit the invention to those embodiments. On the contrary, it is intended to cover all alternatives, modifications and equivalents as may be included within the spirit and scope of the invention as defined by the appended claims.

The present invention is described herein as being used to remove excess foam from a wall 10. Yet, it is understood that the present invention can be used in other applications, such as but not limited to an artistic application of creating an object from a volume of foam, foam removal in boat and building applications, without departing from the broad aspects of the present invention.

Figure 1:
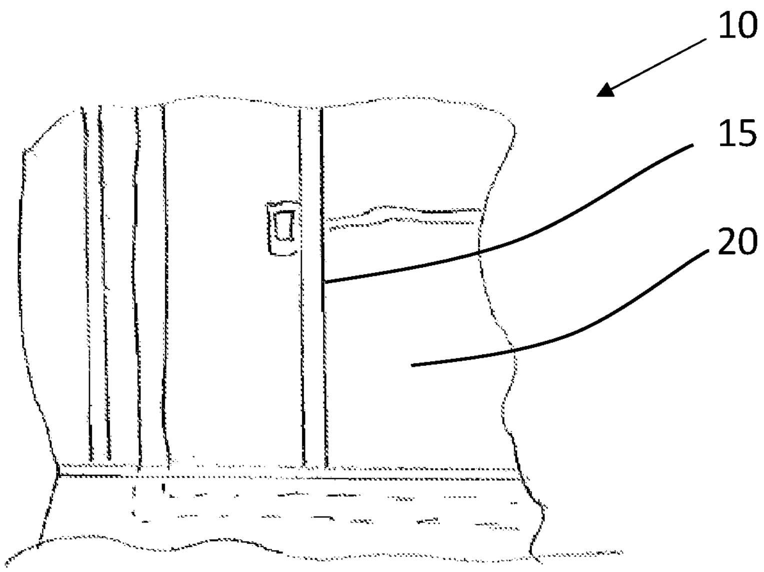
FIG. 1 is a view of a wall showing studs and cavities.
Figure 2:
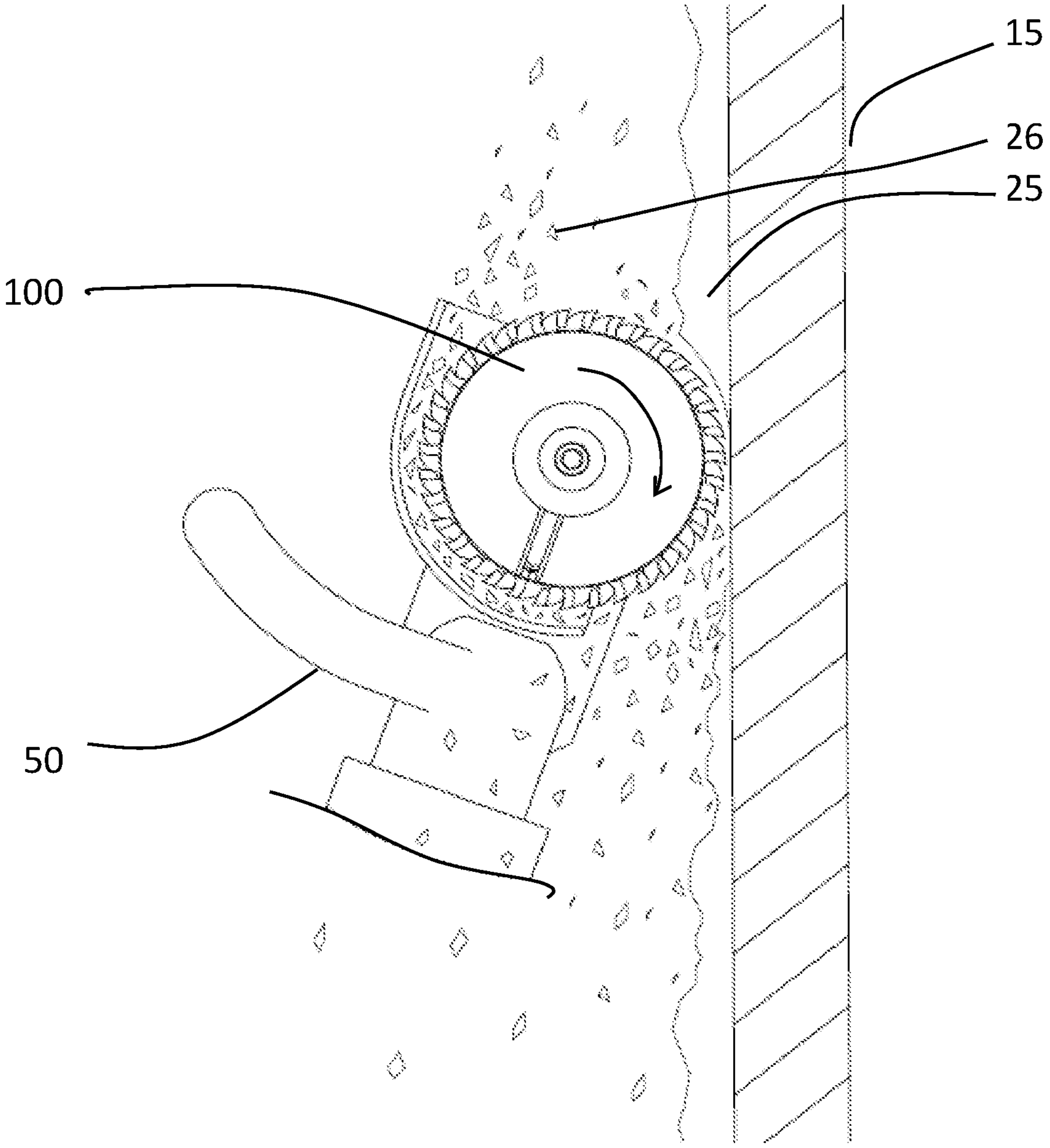
FIG. 2 is a side view showing an embodiment of a foam removal attachment removing foam during operation.

A portion of a wall 10 is shown in FIGS. 1-2. The wall 10 can be constructed of studs 15 that define cavities 20 therebetween. The cavities 20 can be filled with foam 25. Electrical wires and plumbing can be contained within the cavities 20. The foam 25, as seen in FIG. 2, may not be fully contained within the cavity and accordingly can extend outward in front of the studs 15. It is appreciated that a wall cavity is just one location where foam can be applied or sprayed. The present invention can be used to remove foam from other locations without departing from the broad aspects of the present invention.

A tool 50, such as a grinder, is shown in FIGS. 2 and 4-6. It is appreciated that the present invention can be used with both corded and cordless tools. It is further appreciated that a grinder is just one example of a possible surface conditioning or drum tools that can be used to rotate the present invention. The present invention can be used with tools other than grinders without departing from the broad aspects of the present invention.

The grinder 50 has a body 55, a handle 60, a shaft 65 and a fastener 70. The operator can selectively turn the grinder 50, either with a continuous or variable speed, on to rotate the shaft 65 relative to the body 55. The fastener 70 can hold an attachment on the shaft 65.

Figure 7:
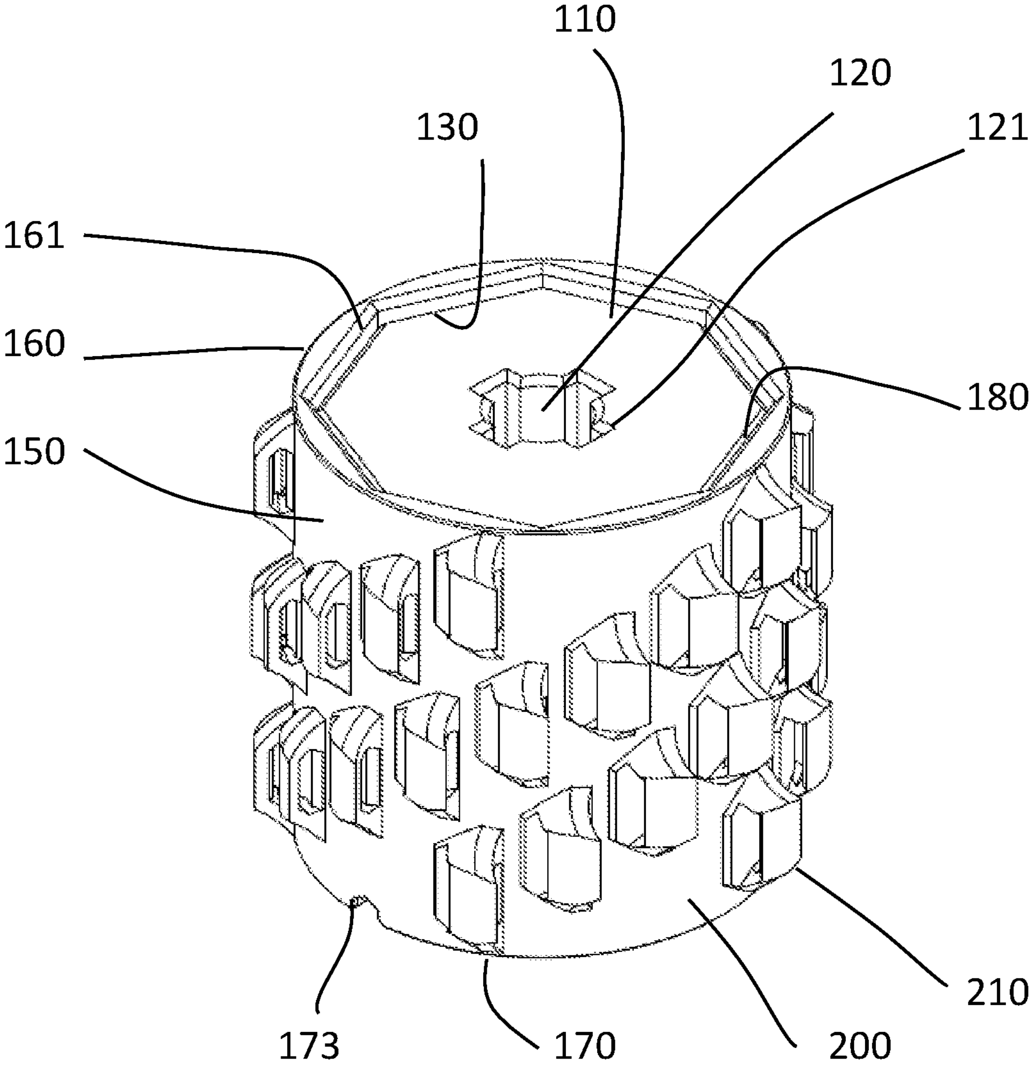
FIG. 7 is a perspective view showing a core and shell in a mating relationship.
Figure 8:
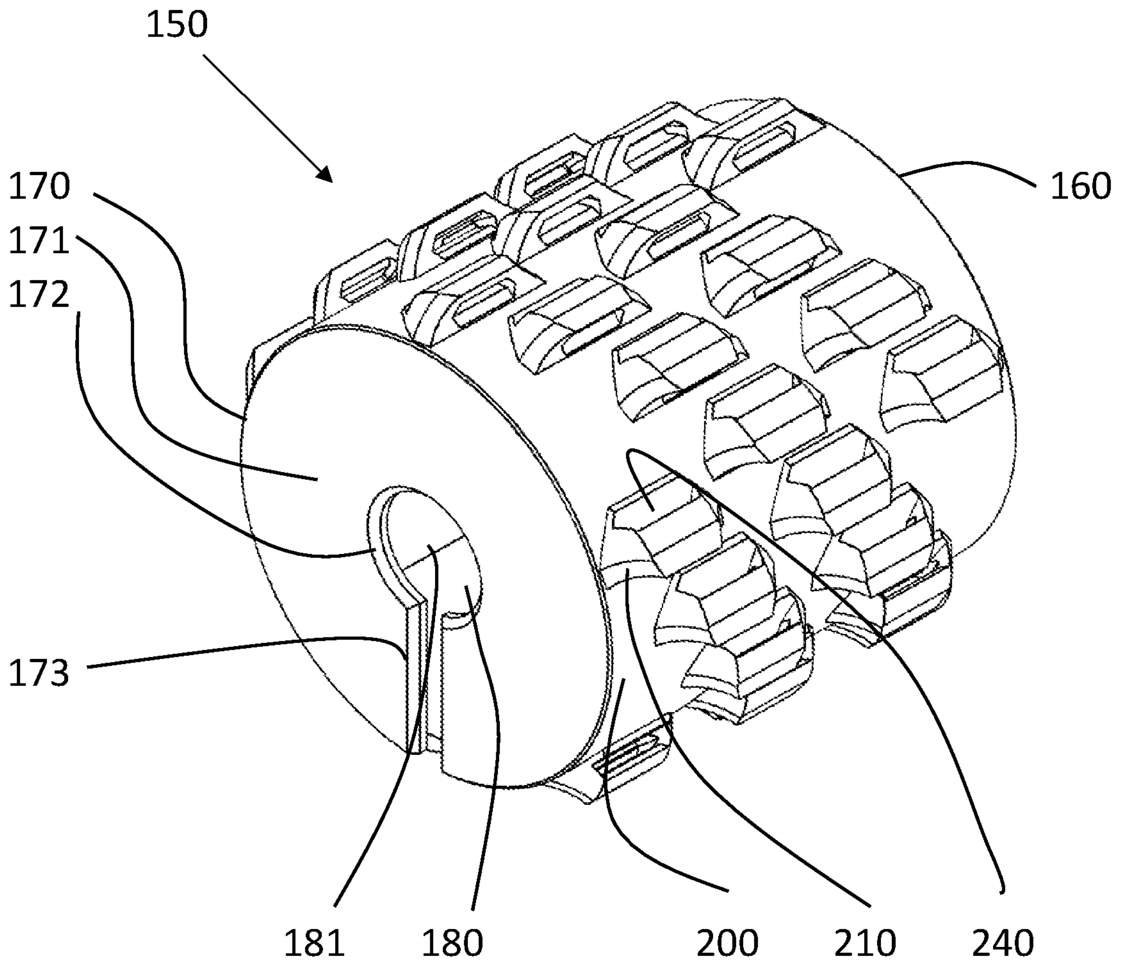
FIG. 8 is a perspective view of an embodiment of a shell.
Figure 9:
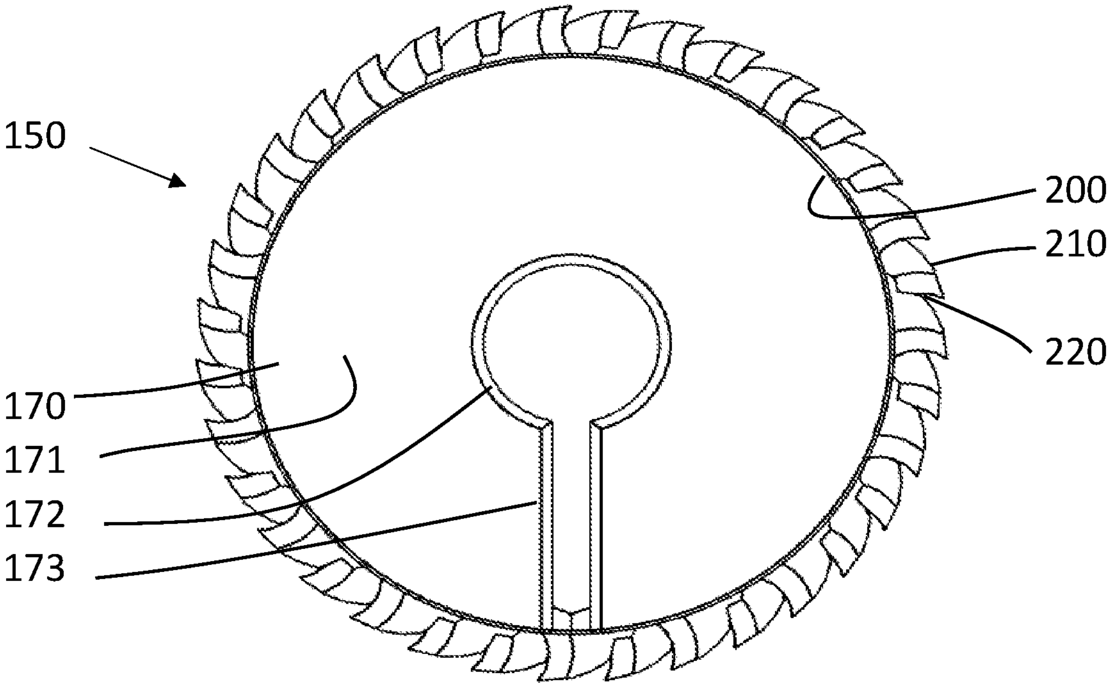
FIG. 9 is an end view of the shell shown in FIG. 8.
Figure 10:
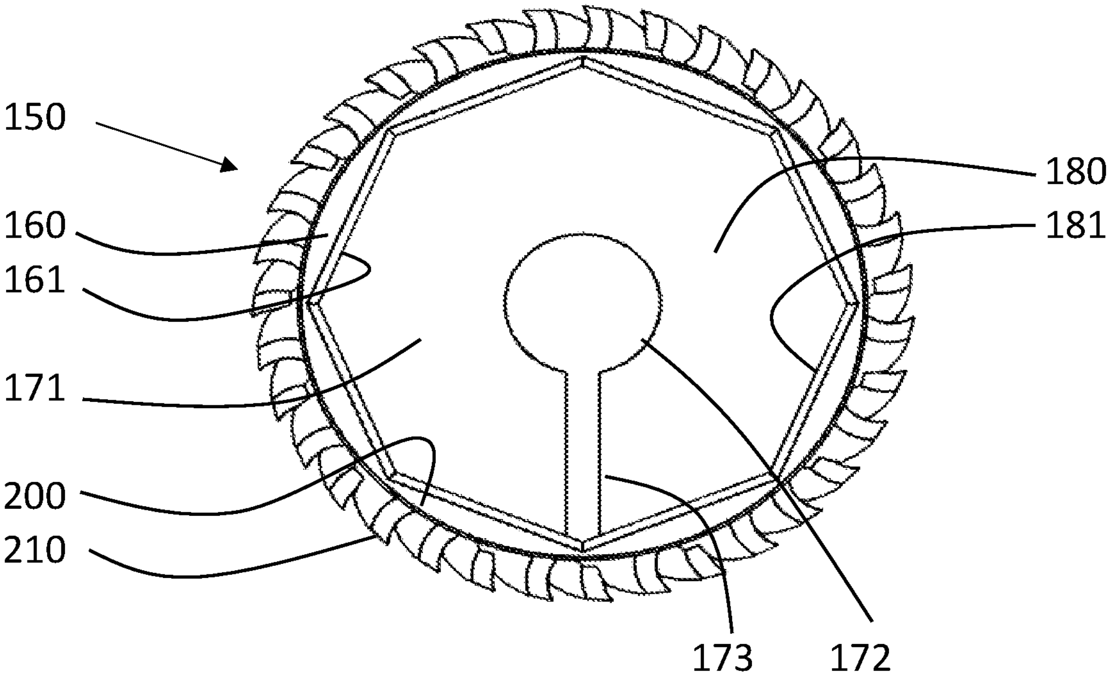
FIG. 10 is an opposite end view of the shell shown in FIG. 8.
Figure 11:
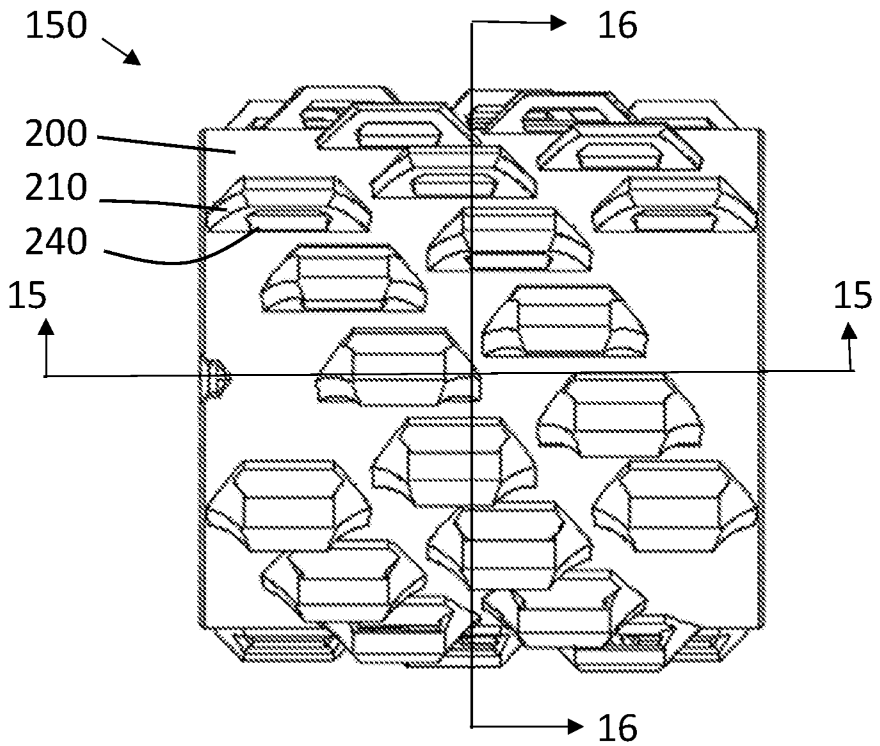
FIG. 11 is a side view of the shell shown in FIG. 9.

Keeping with FIGS. 2 and 4-6, and also looking at FIG. 7, it is seen that an attachment 100 is provided and can be attached to the grinder 50.

In the preferred and illustrated embodiment, the attachment 100 has a core 110 and a shell 150. These two components can be formed of a single component in an alternative embodiment. In the preferred embodiment, the shell is made of a resin or composite blend resin or ceramic or other suitable material, and the core is made of plastic, resin, composite resin, rubber, metal, ceramic or other suitable material.

The preferred embodiment of the core 110 has an inner passage 120 with slots 121 that is selectively connected to the shaft 65 of the grinder 50. The core 110 also has an outer profile 130 comprised of walls 131. In the preferred embodiment, the profile has eight walls forming an octagon shaped perimeter viewed from the end. It is understood that the outer profile of the core 110 can be shaped differently (such as a square, triangle, rectangle, polygon, other shape with a flat side, or another mating shape) without departing from the broad aspects of the present invention.

The shell 150 is shown in isolation in FIGS. 8-16. Shell 150 has an end 160 with a large opening 161. The opposite end 170 has an end wall 171 with an end wall opening 172 therethrough. End wall opening 172 is sufficiently sized so that fastener 70 can engage the end of the shaft 65 to lock the attachment 100 to the grinder 50. A primary slot 173 is open to opening 172 and extends through the outer wall 200, as describe below. The slot 173 is preferably oriented normal to the outer wall 200 in the illustrated embodiment.

The shell 150 has a cavity 180 with an inner profile that is shaped to mate with the outside of the core 110. In the illustrated embodiment, the cavity inner profile has eight walls 181. The perimeter of the shell cavity 180 is larger than the outer perimeter of the core 110, wherein the core can be selectively slid into and out of the shell cavity 180 (unless the attachment is locked in place). The core 110 and shell 150 preferably rotate together as the tool shaft 64 rotates.

The shell 150 has an outer wall 200. There are many projections 210, described below, that extend radially outward from the outer wall 200. The projections are preferably arranged in a spiral pattern about the shell 150. There are several spirals of projections 210 around the outer wall 200. It is appreciated that the protrusion pattern can change without departing from the broad aspects of the present invention.

Figure 12:
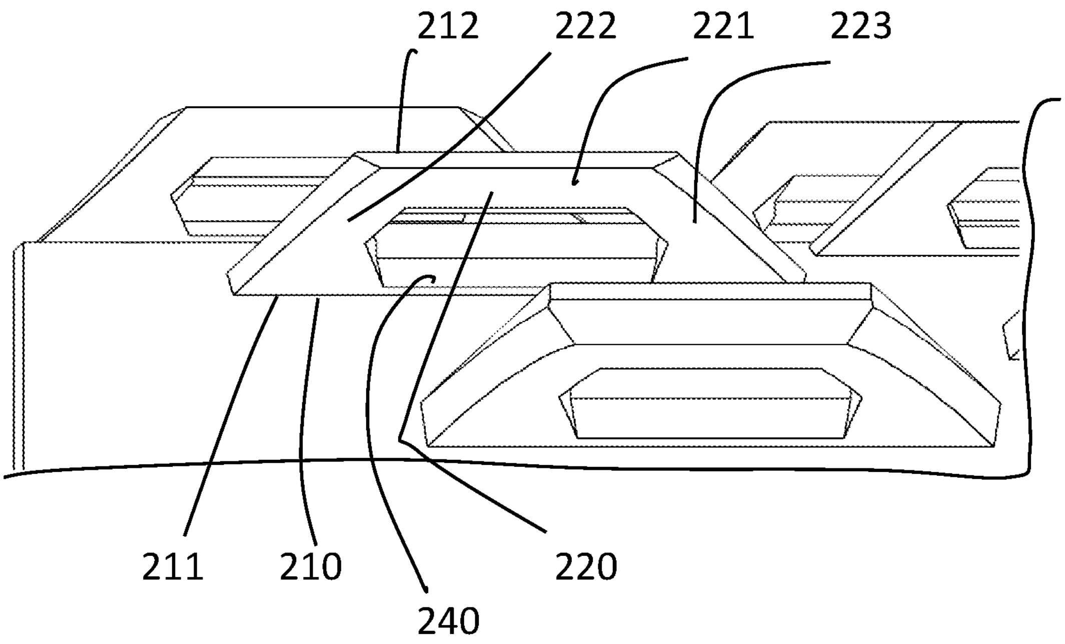
FIG. 12 is a close-up view of a portion of FIG. 11.
Figure 13:
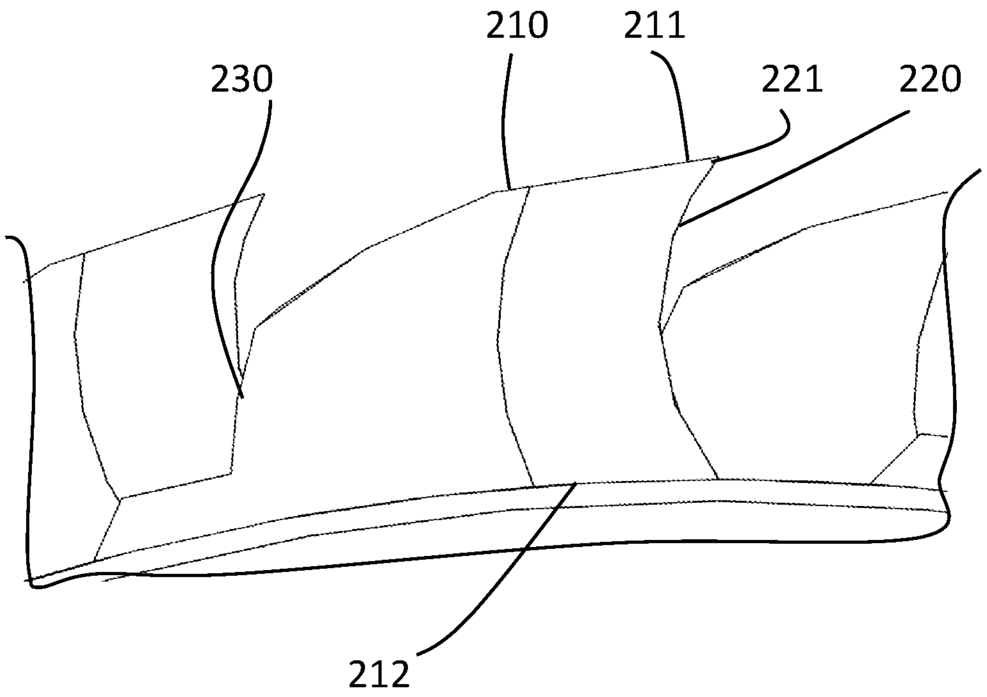
FIG. 13 is a close-up end view showing a projection profile.

Each projection 210 has a distal end 211 and a proximal end 212. The projection 210 has a leading face 220 and a trailing face 230. The leading face 220 has a top 221 and two sides 222 and 223. A passage 240 is through the projection and is open to the leading face 220 and trailing face 230. In this regard, the passage 240 does not pass through the outer wall 200. It is preferred that top 221 of the leading face of each projection lies along an axis that is parallel to the axis of the other front face tops. The passage 240, as seen in FIG. 12, can be offset from the outer wall 200 in order to provide extra strength to the protrusion.

In a preferred embodiment, the passage 240 has a height of 4.5 mm and a width of 13 mm, and each projection has an overall height of 7.6 mm and a width of 14 mm. These dimensions can change without departing from the broad aspects of the present invention.

Figure 14:
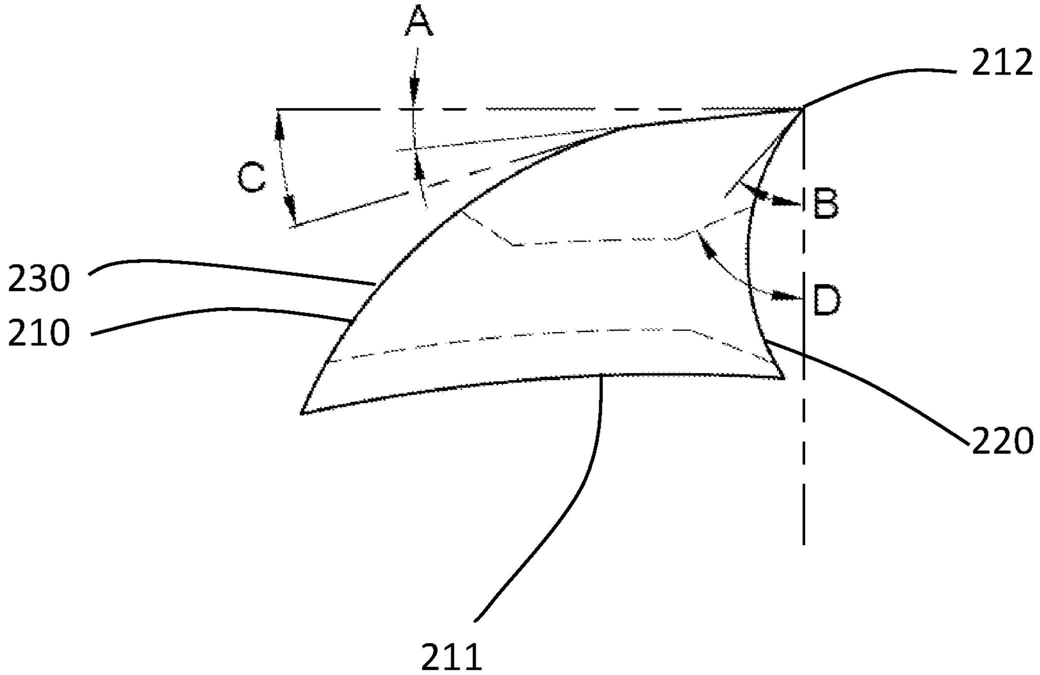
FIG. 14 is a side view of a projection showing several angles.
Figure 15:
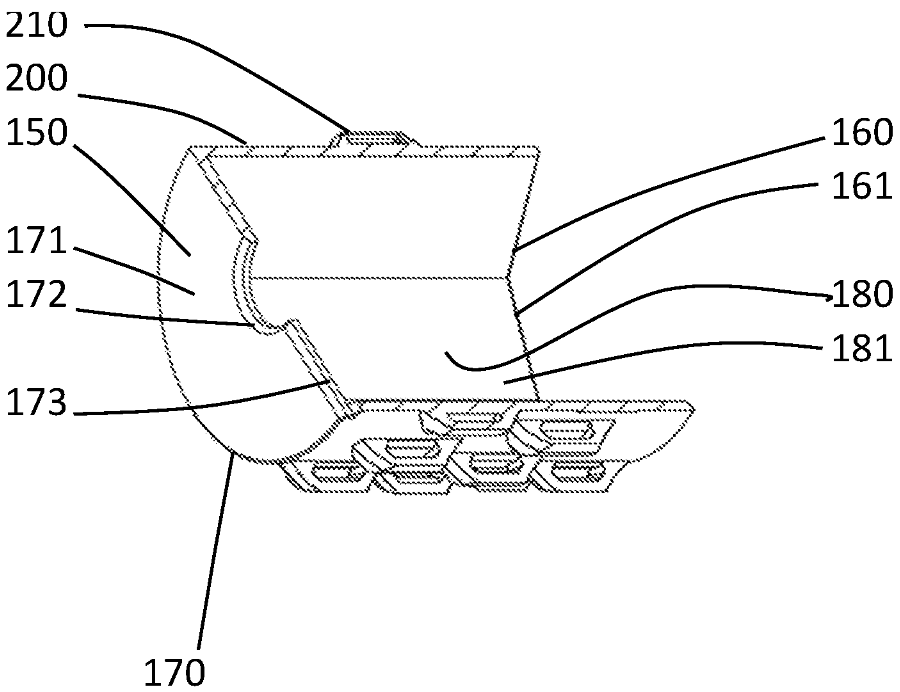
FIG. 15 is a cross-sectional view taken along line 15-15 in FIG. 11.
Figure 16:
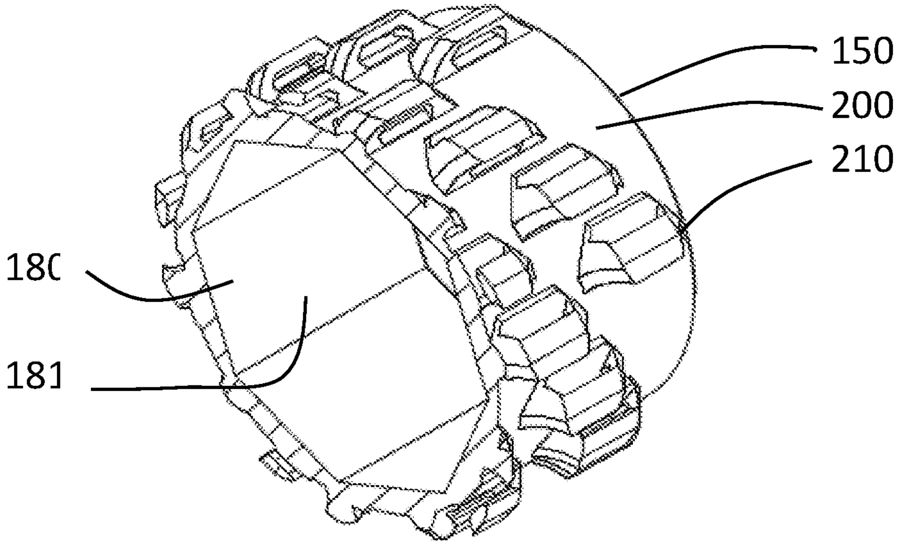
FIG. 16 is a cross-sectional view taken along line 16-16 in FIG. 11.

As can be seen in FIG. 14, there are several angles used with the projections. The external primary clearance angle can vary between 0 and 30 degrees. The rake angle can vary between −20 and 90 degrees. The secondary clearance angle can vary between 0 and 90 degrees. The pass-through clearance angle can vary between 0 and 120 degrees. In the illustrated embodiment, the primary clearance angle is shown to be between 5 and 15 degrees and can be 10 degrees. Further, the secondary clearance angle is shown to be between 40 and 50 degrees and can be 45 degrees. Still further, the rake angle is shown to be between 25 and 35 degrees, and can be 30 degrees. Still further yet, the pass through clearance angle is shown to be between 80 and 90 degrees, and can be 85 degrees. The reason for the wide range of possible angles is that different results can be achieved with different angles.

Slot 173 passes through the end 170 and spans between opening 172 and the outer wall 200 (and extends through the outer wall).

Figure 3:
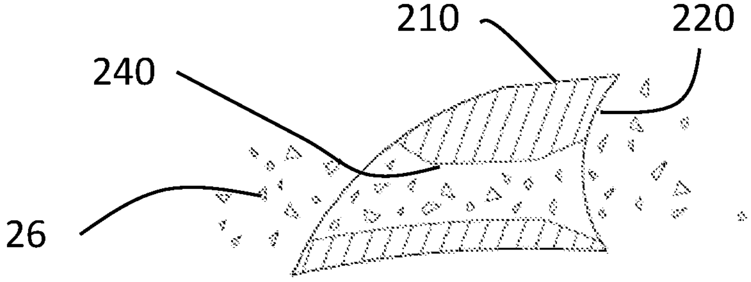
FIG. 3 is a cross-sectional view of a projection showing debris passing therethrough.
Figure 4:
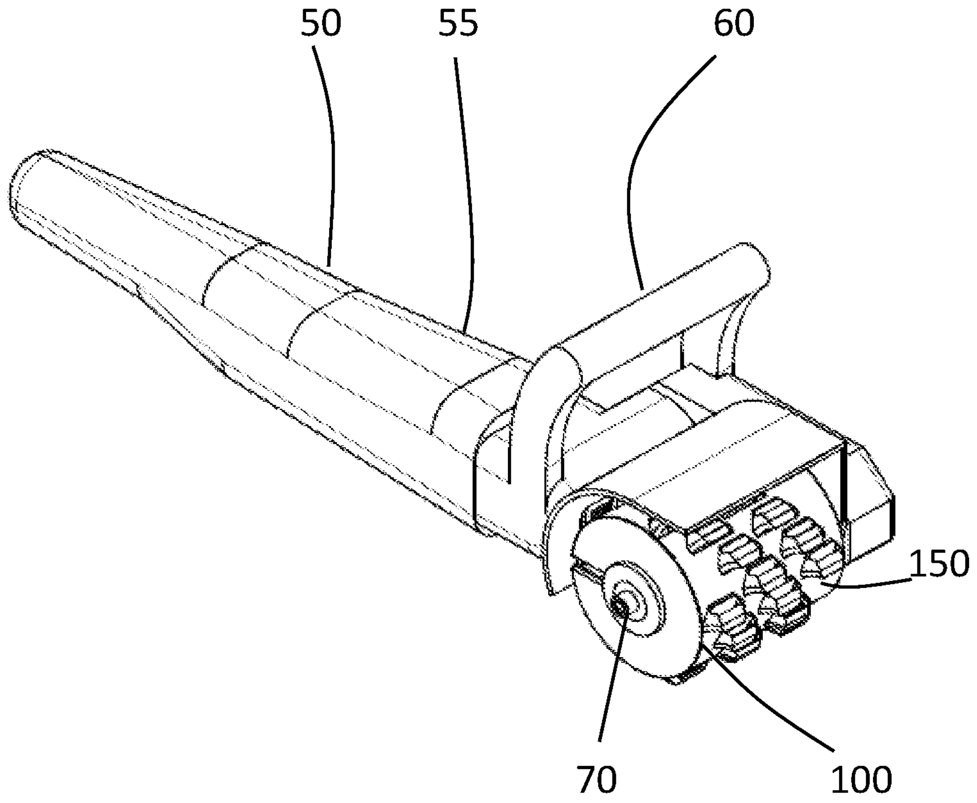
FIG. 4 is a perspective view showing the attachment secured to a grinder.
Figure 5:
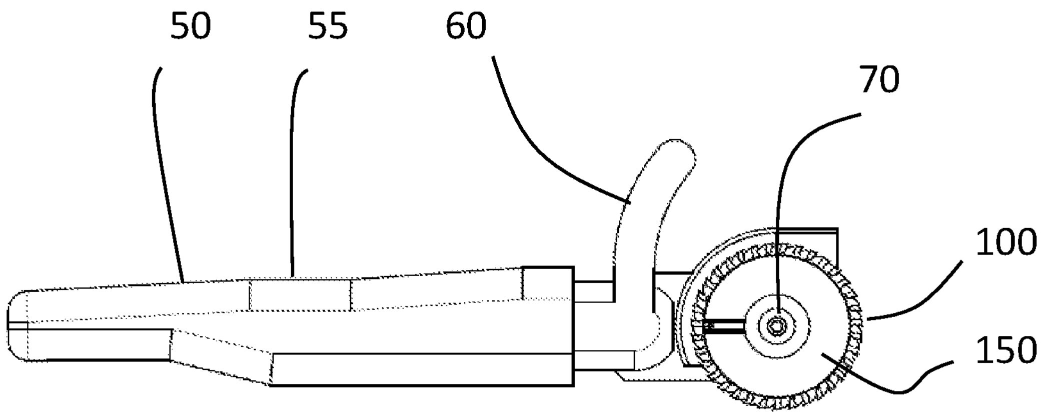
FIG. 5 is a side view of the attachment attached to a grinder.
Figure 6:
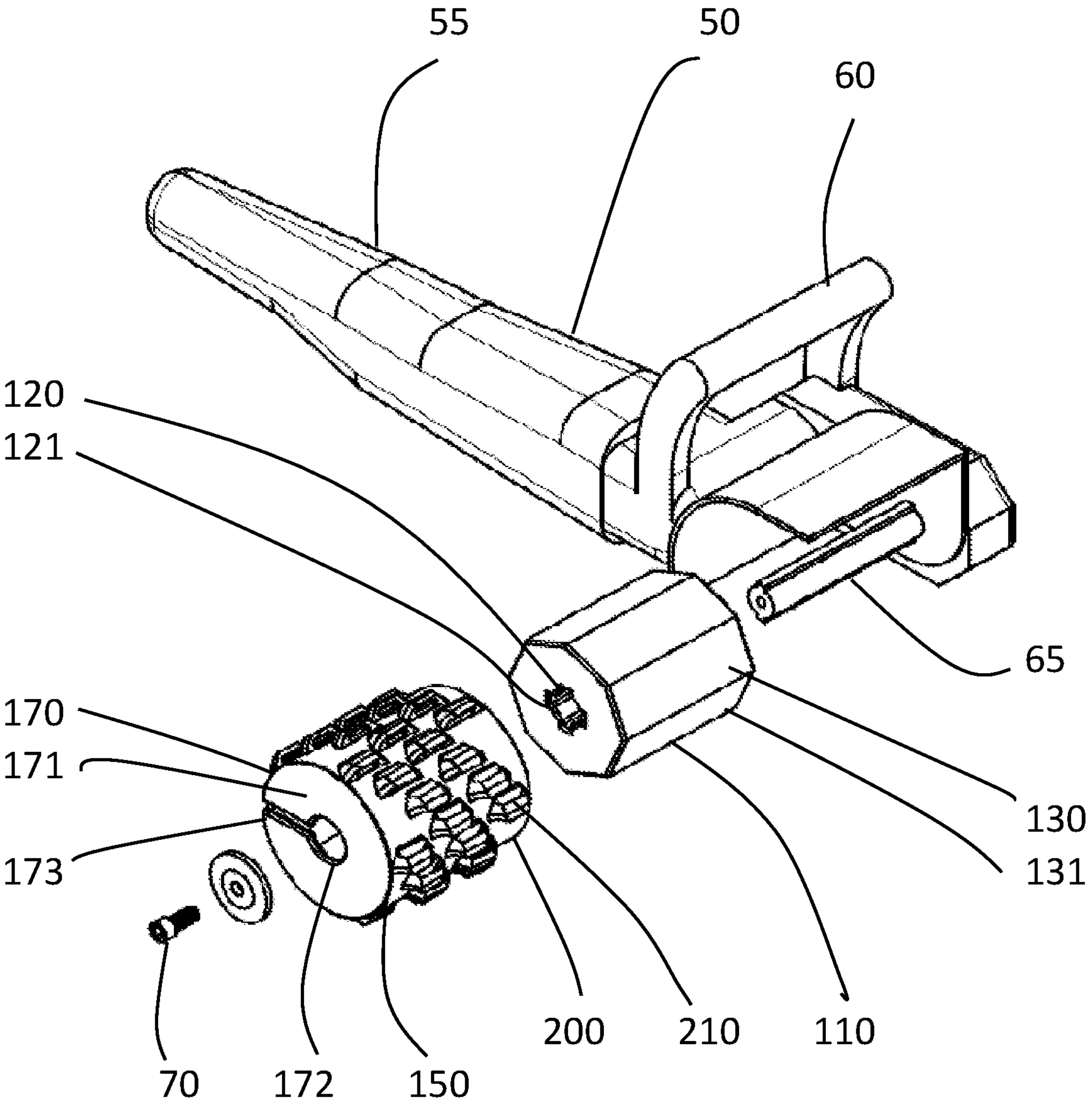
FIG. 6 is an exploded view of FIG. 4.

As can be seen in FIG. 3, during use, some foam debris 26 can pass through the passage 240 of each projection 210 as the projection engages the foam.

The top 221 of the leading face 220 (at the projection distal end 211) is sharp and can slice, shave, serrate or carve the foam, directing it either through the passage or around the sides 222 or 223 of the projection. Debris that is smaller than the passage size can pass through the passage. Larger pieces of debris pass around the projections, as does some of the small pieces of debris. Air also passes through the passage 240 to cool the projection.

Figure 17:
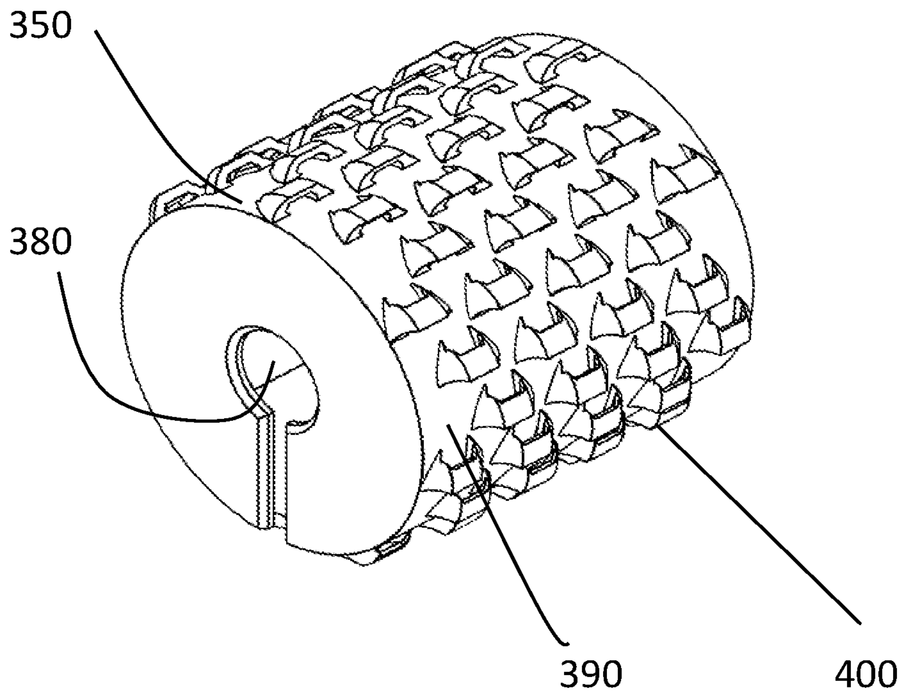
FIG. 17 is a perspective view of shell with medium size projections.
Figure 18:
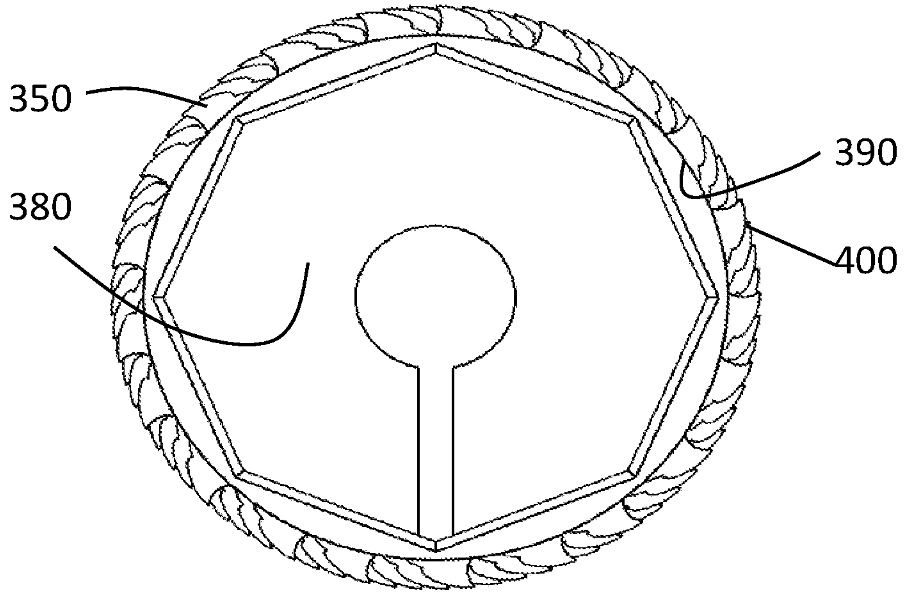
FIG. 18 is an end view of the shell shown in FIG. 17.
Figure 19:
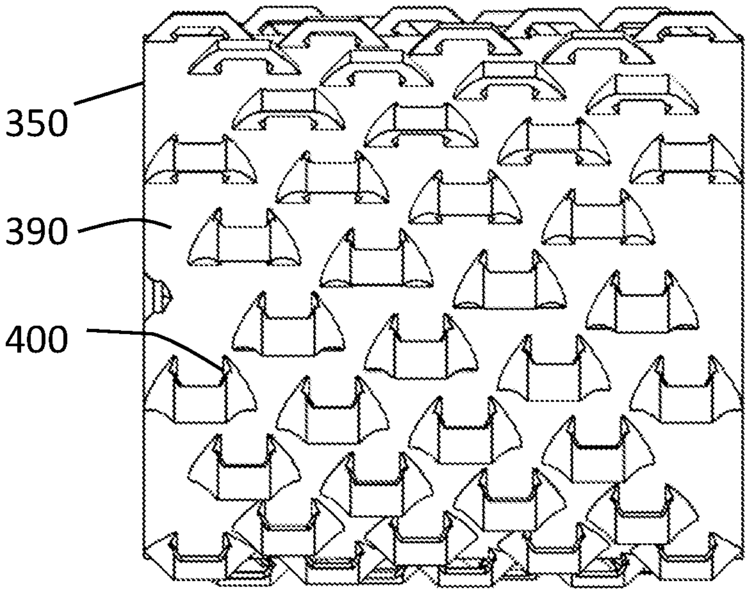
FIG. 19 is a side view of the shell shown in FIG. 17.

Turning now to FIGS. 17-19, it is seen that an attachment shell 350 of a different size is illustrated. The shell 350 has a cavity 380 that can be used with an appropriately sized core (not shown). The shell 350 also has an outer wall 390 with a plurality of protrusions 400.

Figure 20:
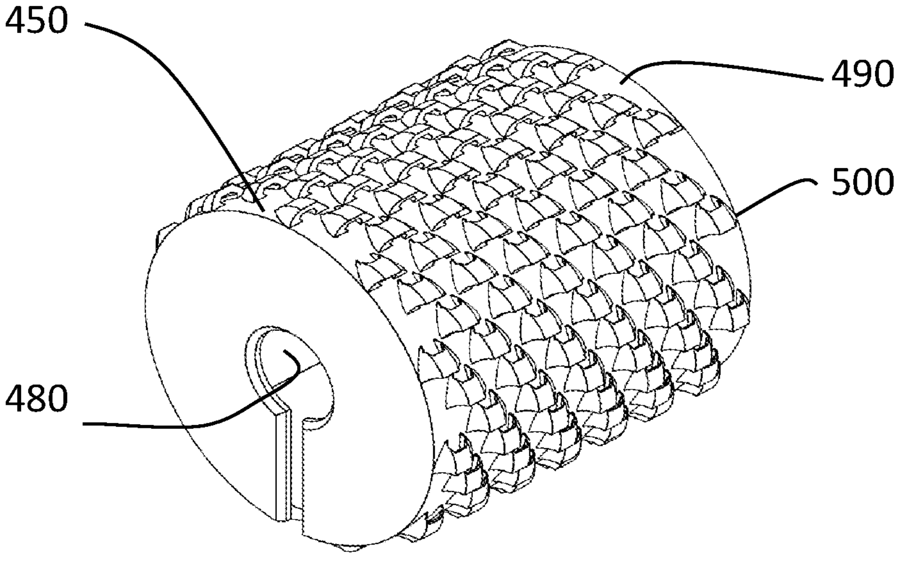
FIG. 20 is a perspective view of shell with small size projections.
Figure 21:
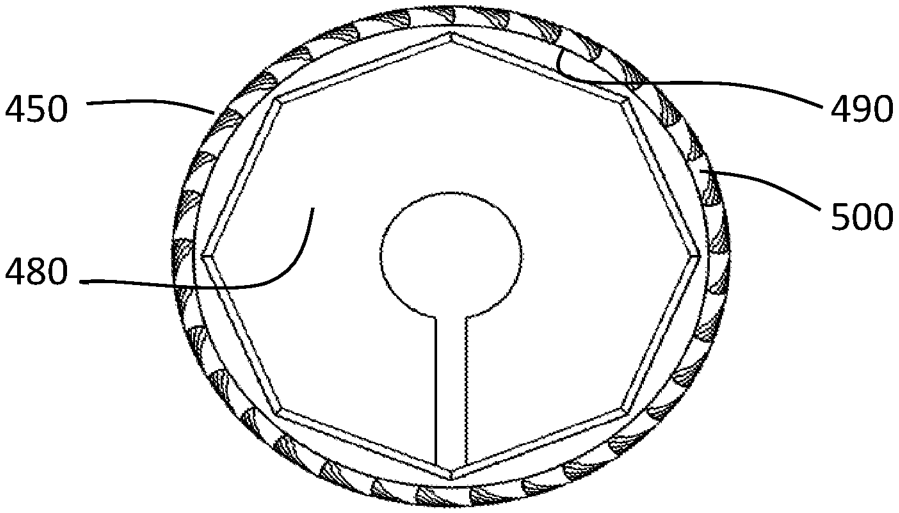
FIG. 21 is an end view of the shell shown in FIG. 20.
Figure 22:
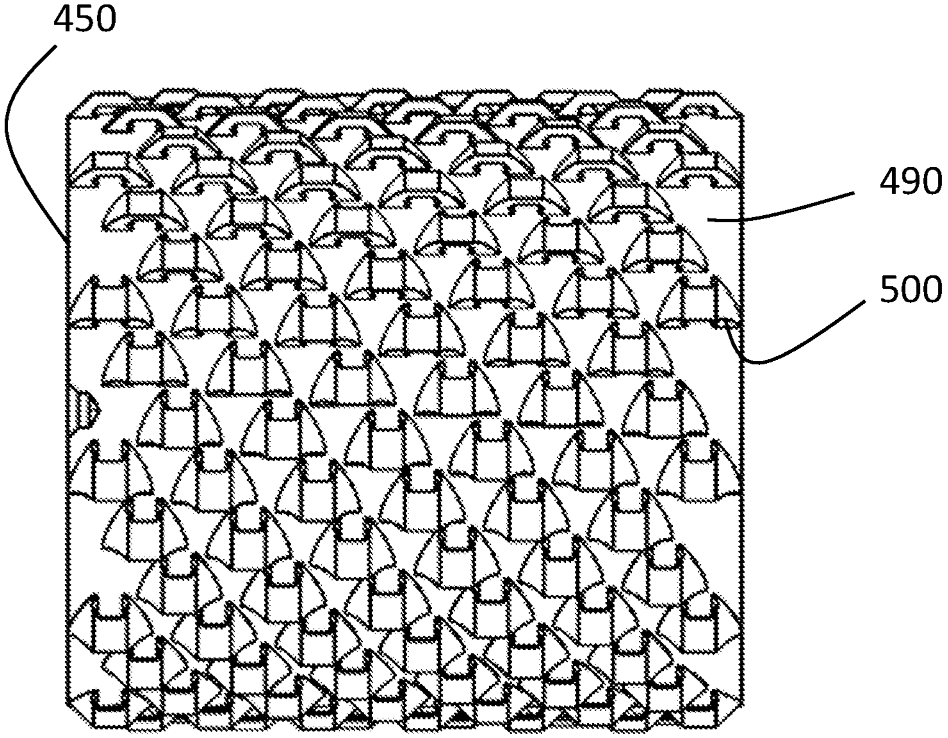
FIG. 22 is a side view of the shell shown in FIG. 20.

Turning now to FIGS. 20-22, it is seen that an attachment shell 450 of a different size is illustrated. The shell 450 has a cavity 480 that can be used with an appropriately sized core (not shown). The shell 450 also has an outer wall 490 with a plurality of protrusions 500.

It is appreciated that three various sizes and numbers of projections are illustrated. The invention is not limited to these specific sizes and protrusion densities. Generally, a shell with larger and fewer numbers of projections is more aggressive to remove relatively large amounts of foam, but generally results in a rougher surface. Shells with smaller and greater numbers of teeth generally remove less foam but result in smoother surfaces. It is appreciated that different shells could be used during the same project.

Figure 23:
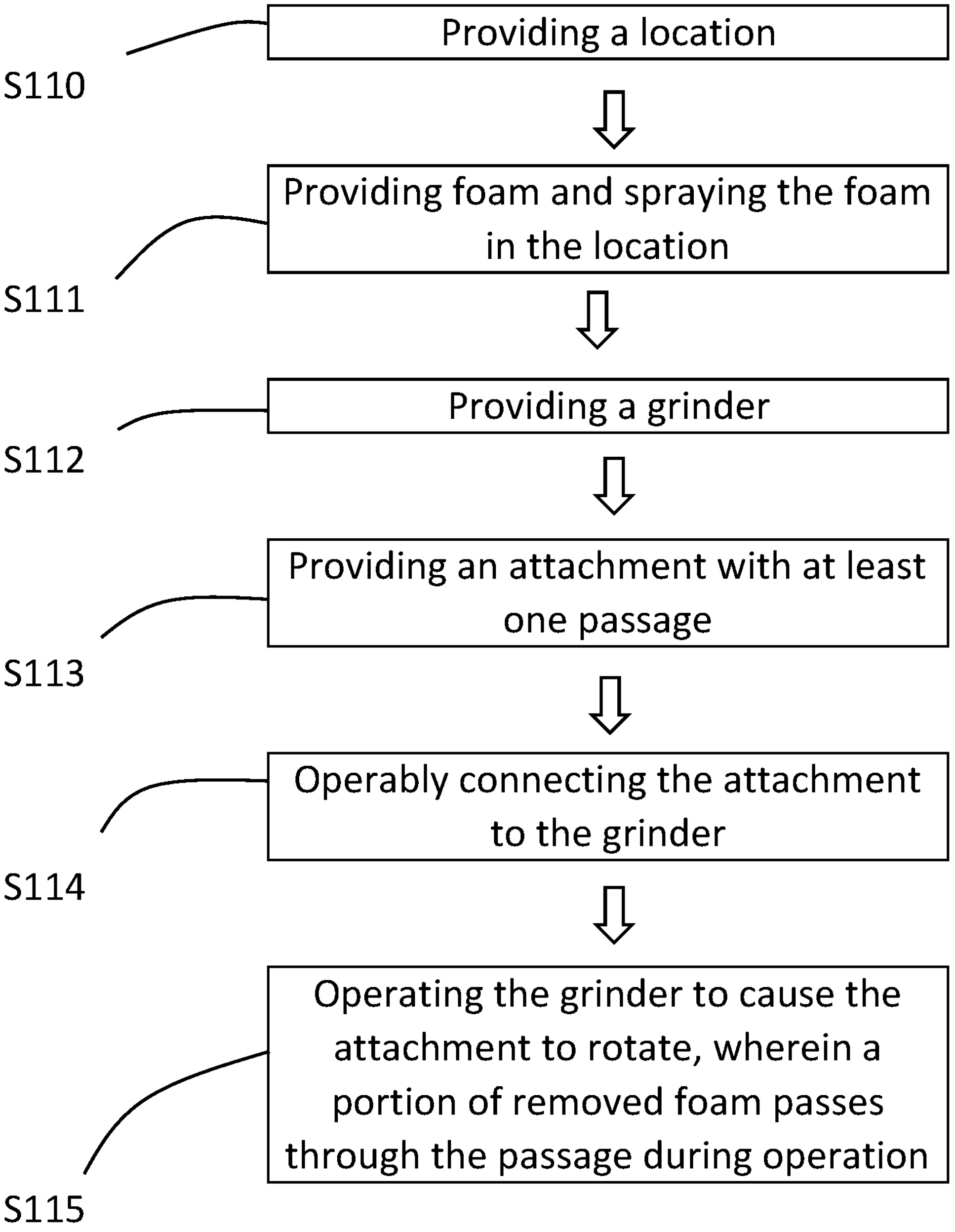
FIG. 23 is a flow chart showing the steps of a method to remove foam from a location.

A method of grinding foam from a wall is seen in FIG. 23 and comprises the steps: (S110) providing a location; (S111) providing foam and spraying the foam in the location; (S112) providing a grinder; (S113) providing an attachment with at least one passage; (S114) operably connecting the attachment to the grinder; and (S115) operating the grinder to cause the attachment to rotate, wherein a portion of removed foam passes through the passage during operation.

Figure 24:
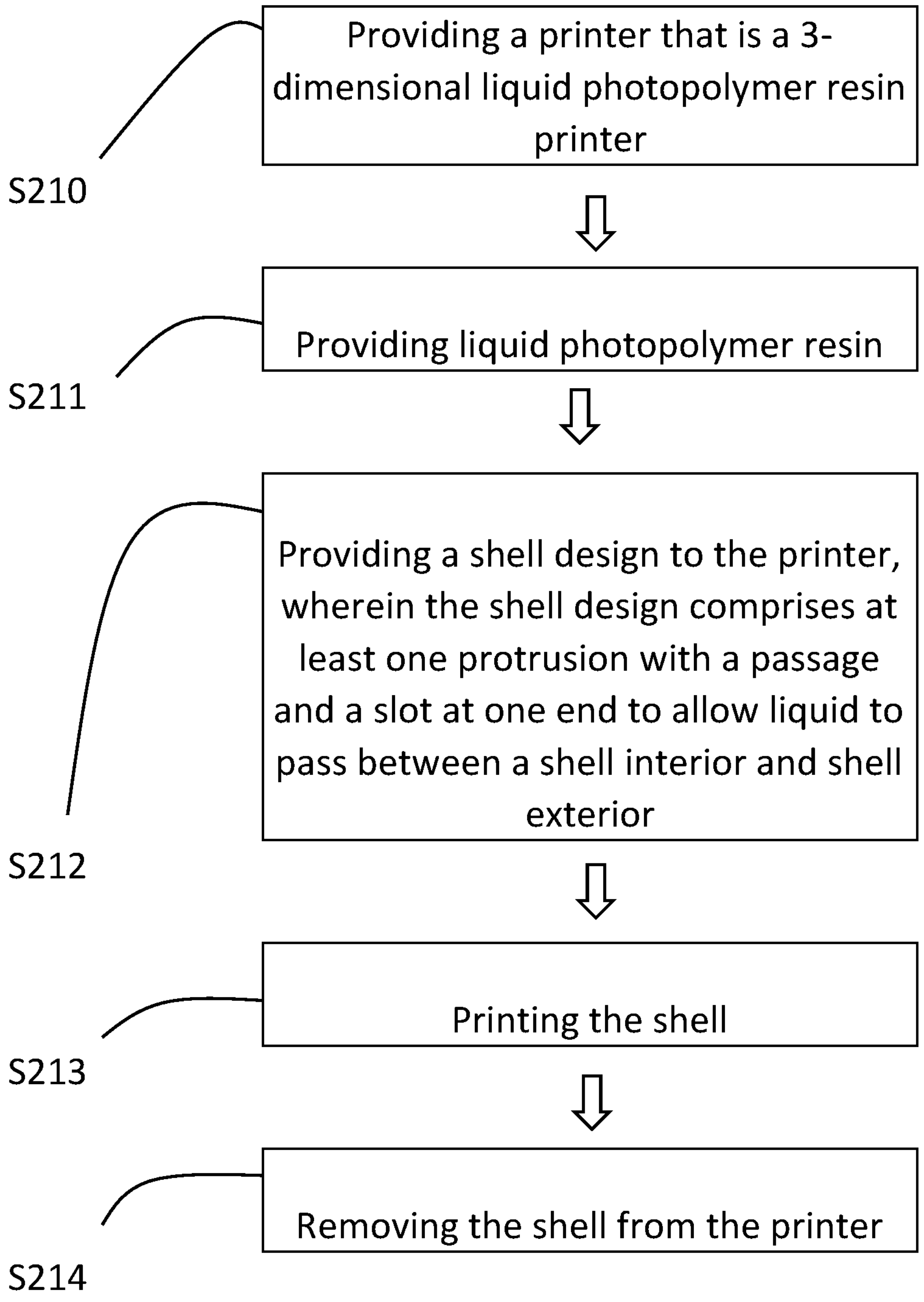
FIG. 24 is a flow chart showing the steps of manufacturing the shell of the present invention.

A method of making a shell for removing foam is seen in FIG. 24 and comprises the steps: (S210) providing a printer that is a 3-dimensional liquid photopolymer resin printer; (S211) providing liquid photopolymer resin; (S212) providing a shell design to the printer, wherein the shell design comprises at least one protrusion with a passage and a slot at one end to allow liquid to pass between a shell interior and a shell exterior; (S213) printing the shell; and (S214) removing the shell from the printer. The inclusion of the slot prevents a vacuum from forming in the interior of the shell as the printer plate rises during the sequence of printing the shell.

It is appreciated that there are several unique structural features according to various aspects of the present invention. These features can be utilized individually or combined with other features in any possible way, such as being coupled with other features, tripled with other features and/or used all together without departing from the broad aspects of the present invention. For example, each of the following features could be used individually or in any manner of combination:

An attachment for removing foam, said attachment comprising: a first end; a second end; and an outer wall with a plurality of projections, each of said plurality of projections having a passage therethrough.

An attachment for use with a tool having a rotating shaft, said attachment comprising: a core, said core having an inner passage selectively attachable to said shaft and an outer profile; and a shell comprising a cavity, an outer wall, a first projection with a first projection passage and a second projection with a second projection passage, wherein: said core is received within said cavity; said first projection passage and said second projection passage pass exterior or said outer wall.

An attachment for removing foam, said attachment comprising: a cavity; an outer wall; a first end; a second end, said second end having a second end wall with a second end opening through said second end wall, said second end also having a primary slot, said primary slot being open to said second end opening and passing through said outer wall; and a plurality of projections having a passage therethrough extending from said outer wall.

Each of these structures can also be combined with each other and/or with one or more of the following features, if not already recited above: having the attachment comprise a core and a shell, having the projections be arranged in a spiral pattern, having the leading face have a sharp top.

It is further appreciated that there are several unique method features according to the present invention. These features can be utilized individually or combined with other features in any possible way, such as being coupled with other features, tripled with other features and/or used all together without departing from the broad aspects of the present invention.

Thus, it is apparent that there has been provided, in accordance with the invention, a foam removal attachment that fully satisfies the objects, aims and advantages as set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. An attachment for removing foam, said attachment comprising:

a first end;

a second end; and an outer wall with a plurality of projections, each of said plurality of projections having a passage therethrough, wherein each of said plurality of projections has:

an external primary clearance angle of approximately between 0 and 30 degrees;

a rake angle of approximately between-20 and 90 degrees;

a secondary primary clearance angle of approximately between 0 and 90 degrees; and a pass-through clearance angle of approximately between 0 and 120 degrees.

2. The attachment of claim 1 wherein each of said plurality of projections extends radially from said outer wall and said passage or each of said plurality of projections does not pass through said outer wall.

3. The attachment of claim 1 wherein said attachment comprises a core and a shell.

4. The attachment of claim 3 wherein:

said core has an outer profile that is a polygon shape; and said shell has a cavity that receives the core.

5. The attachment of claim 1 wherein:

the external primary clearance angle is approximately between 5 and 15 degrees;

the rake angle is approximately between 25 and 35 degrees;

the secondary primary clearance angle is approximately between 40 and 50 degrees; and the pass-through clearance angle is approximately between 80 and 90 degrees.

6. The attachment of claim 1 wherein:

the external primary clearance angle is approximately 10 degrees;

the rake angle is approximately 30 degrees;

the secondary primary clearance angle is approximately 45 degrees; and the pass-through clearance angle is approximately 85 degrees.

7. The attachment of claim 1 wherein said second end has an opening and a primary slot, said primary slot being open to an end wall opening and through said outer wall.

8. An attachment for use with a tool having a rotating shaft, said attachment comprising:

a core, said core having an inner passage selectively attachable to said shaft and an outer profile; and a shell comprising a cavity, an outer wall, a first projection with a first projection passage and a second projection with a second projection passage, wherein:

said core is received within said cavity;

said first projection passage and said second projection passage pass exterior of said outer wall; and said first projections has:

an external primary clearance angle of approximately between 0 and 30 degrees;

a rake angle of approximately between-20 and 90 degrees;

a secondary primary clearance angle of approximately between 0 and 90 degrees; and a pass-through clearance angle of approximately between 0 and 120 degrees.

9. The attachment of claim 8 wherein:

the external primary clearance angle is approximately between 5 and 15 degrees;

the rake angle is approximately between 25 and 35 degrees;

the secondary primary clearance angle is approximately between 40 and 50 degrees; and the pass-through clearance angle is approximately between 80 and 90 degrees.

10. The attachment of claim 8 wherein:

the external primary clearance angle is approximately 10 degrees;

the rake angle is approximately 30 degrees;

the secondary primary clearance angle is approximately 45 degrees; and the pass-through clearance angle is approximately 85 degrees.

11. The attachment of claim 8 wherein said shell has a first end and a second end, said second end having a primary slot being open to an end wall opening and through a passage wall.

12. The attachment of claim 8 wherein said first projection and said second projection are part of a plurality of projections arranged in a helical path around said outer wall of said shell.

13. An attachment for removing foam, said attachment comprising:

a cavity;

an outer wall;

a first end;

a second end, said second end having a second end wall with a second end opening through said second end wall, said second end also having a primary slot, said primary slot being open to said second end opening and passing through said outer wall; and a plurality of projections having a passage therethrough extending from said outer wall, wherein the plurality of projections has a first projection, said first projection has:

an external primary clearance angle of approximately between 5 and 15 degrees;

a rake angle of approximately between 25 and 35 degrees;

a secondary primary clearance angle of approximately between 40 and 50 degrees; and a pass-through clearance angle of approximately between 80 and 90 degrees.

14. The attachment of claim 13 wherein:

the external primary clearance angle is approximately 10 degrees;

the rake angle is approximately 30 degrees;

the secondary primary clearance angle is approximately 45 degrees; and the pass-through clearance angle is approximately 85 degrees.

15. The attachment of claim 13 wherein said plurality of projections are arranged in a helical path around said outer wall.

16. The attachment of claim 15 wherein:

said plurality of projections are a first plurality of projections; and said attachment further comprises a second plurality of projections arranged in a second helical path around said outer wall.

17. The attachment of claim 13 further comprising a core.

18. An attachment for removing foam, said attachment comprising:

a first end;

a second end; and an outer wall with a plurality of projections, each of said plurality of projections having a passage therethrough, wherein said second end has an opening and a primary slot, said primary slot being open to an end wall opening and through said outer wall.

19. An attachment for use with a tool having a rotating shaft, said attachment comprising:

a core, said core having an inner passage selectively attachable to said shaft and an outer profile; and a shell comprising a cavity, an outer wall, a first projection with a first projection passage and a second projection with a second projection passage, wherein:

said core is received within said cavity;

said first projection passage and said second projection passage pass exterior or said outer wall; and said shell has a first end and a second end, said second end having a primary slot being open to an end wall opening and through said outer wall.

* * * * *